United States Patent
Rempinski

[19]

[11] Patent Number: 6,142,034
[45] Date of Patent: Nov. 7, 2000

[54] MANUAL TRANSMISSION SHIFTER WITH REVERSE LOCKOUT DEVICE

[75] Inventor: Donald R. Rempinski, Grand Haven, Mich.

[73] Assignee: Grand Haven Stamped Products, Grand Haven, Mich.

[21] Appl. No.: 09/140,119

[22] Filed: Aug. 25, 1998

Related U.S. Application Data

[60] Provisional application No. 60/057,175, Aug. 26, 1997.

[51] Int. Cl.$^7$ .................................................... F16H 61/18
[52] U.S. Cl. .................................. 74/473.22; 74/473.25; 403/56
[58] Field of Search ........................... 74/473.21, 473.22, 74/473.25, FOR 103, 473.3, 473.34, 473.35, 473.27; 70/245, 247, 254, 201; 403/56; 285/146.1, 146.2, 146.3

[56] References Cited

U.S. PATENT DOCUMENTS

| | | |
|---|---|---|
| 3,572,152 | 3/1971 | Bruhn, Jr. et al. . |
| 3,774,469 | 11/1973 | Bruhn, Jr. . |
| 3,786,690 | 1/1974 | Bruhn, Jr. . |
| 3,998,110 | 12/1976 | O'Brien et al. ...................... 74/473.22 |
| 4,282,768 | 8/1981 | Osborn . |
| 4,328,712 | 5/1982 | Osborn . |
| 4,541,257 | 9/1985 | Stoll ......................................... 74/523 |
| 4,569,245 | 2/1986 | Feldt et al. . |
| 5,263,383 | 11/1993 | Meisch et al. . |
| 5,313,853 | 5/1994 | Olmsted et al. . |
| 5,507,199 | 4/1996 | Lampani . |
| 5,588,934 | 12/1996 | Osborn et al. . |
| 5,649,452 | 7/1997 | Osborn et al. . |
| 5,651,290 | 7/1997 | Osborn et al. . |
| 5,687,615 | 11/1997 | Takemura et al. ................... 74/473.26 |
| 5,749,261 | 5/1998 | Numakami . |

FOREIGN PATENT DOCUMENTS

| | | |
|---|---|---|
| 0137941 | 4/1985 | European Pat. Off. . |
| 718781 | 1/1932 | France ............................ 74/FOR 103 |
| 2000596 | 7/1971 | Germany ........................ 74/FOR 102 |
| 3400556 | 2/1985 | Germany . |
| 8327 | of 1914 | United Kingdom ............ 74/FOR 103 |
| 2070159 | 9/1981 | United Kingdom ............ 74/FOR 103 |

*Primary Examiner*—David A. Bucci
*Assistant Examiner*—William C Joyce
*Attorney, Agent, or Firm*—Price Heneveld Cooper Dewitt & Litton

[57] ABSTRACT

A shifter for shifting a vehicle transmission includes a base adapted for attachment to a vehicle including a pivot-defining mount, and a shift lever having an elongated bottom section pivoted to the mount, and a top section slidably engaging the bottom section for movement between a normal operating position for shifting between gears and a depressed-position for shifting into reverse gear. A reverse lockout device including a stationary locking member is attached to the base and a movable lockout member is slidably mounted on the shift lever. A linkage connects a bottom of the top section of the shift lever to the movable lockout member, the linkage being elongated and extending closely adjacent the elongated bottom section for compact operation next to the elongated bottom section when the top section is depressed. In one form, the linkage comprises a pair of parallel links on opposing sides of the elongated bottom section of the shift lever. In another form, the linkage comprises a plurality of links connected in series to form a snake-like chain that rides on the bottom section of the shift lever, some of the links having a ball on one end and others having a socket on the other end for engaging the ball.

18 Claims, 12 Drawing Sheets

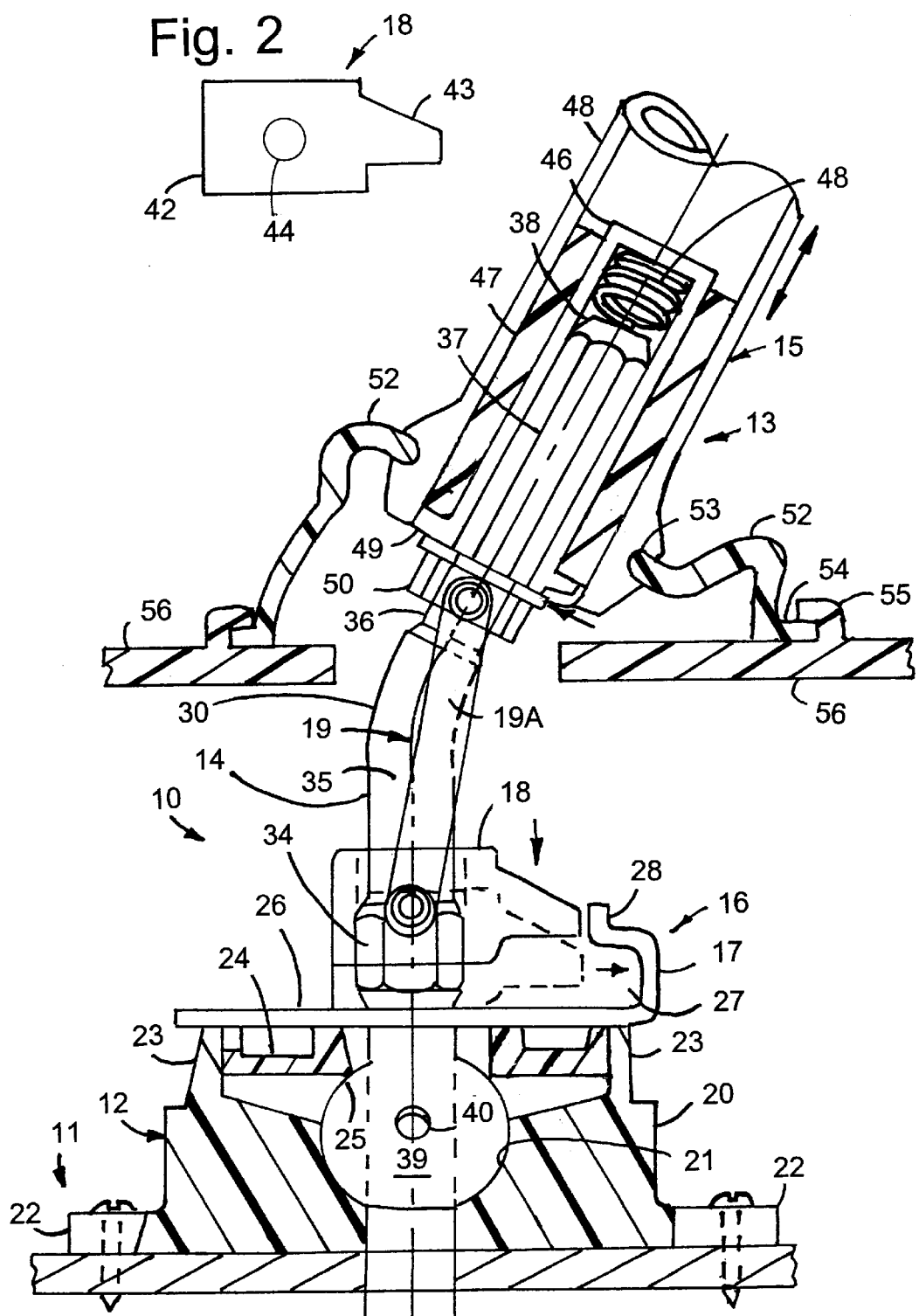

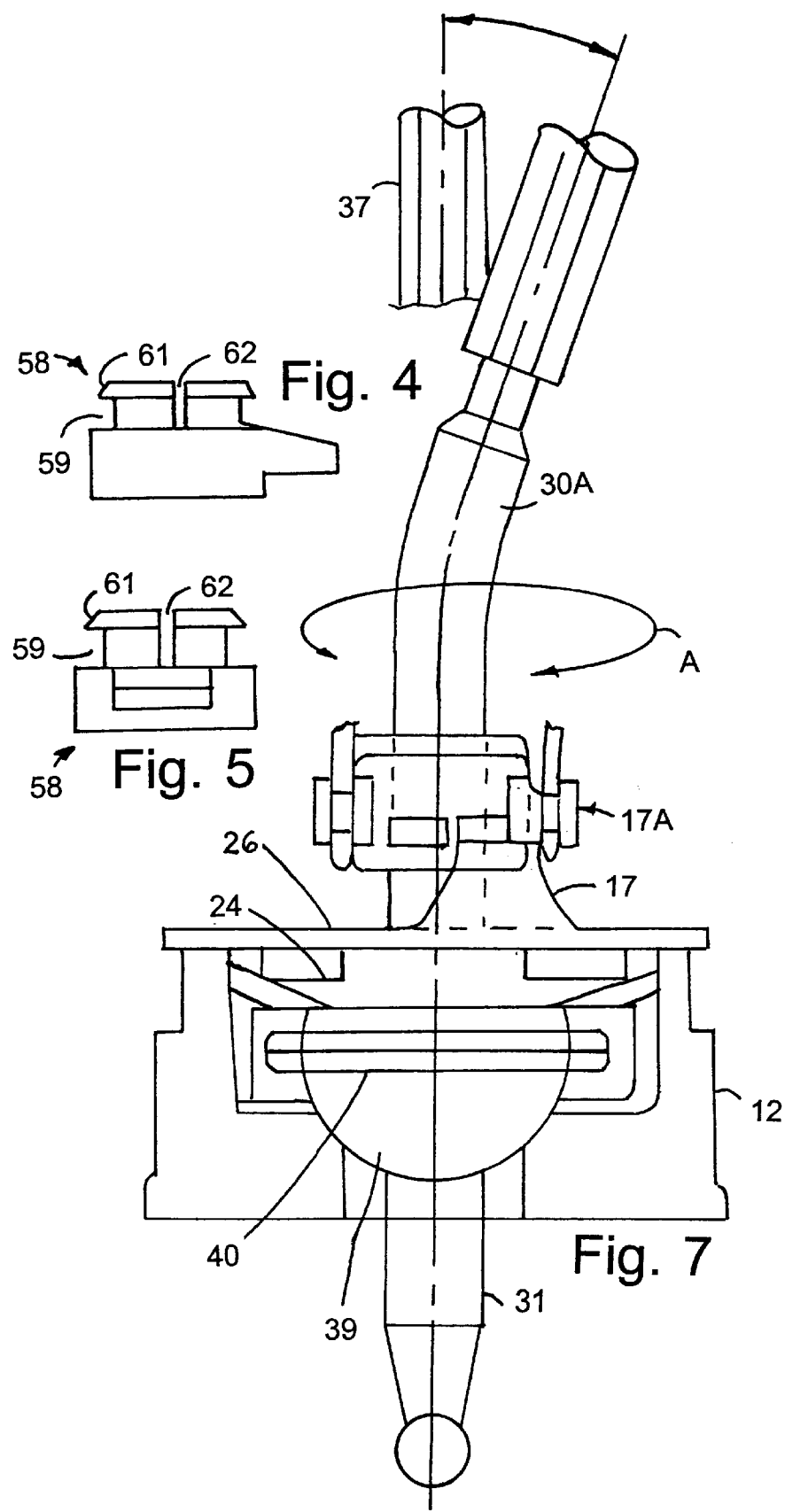

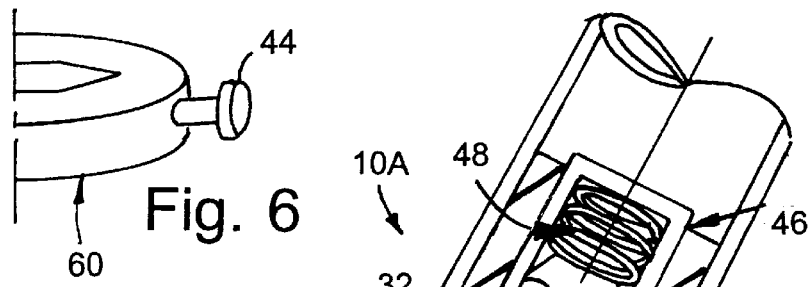
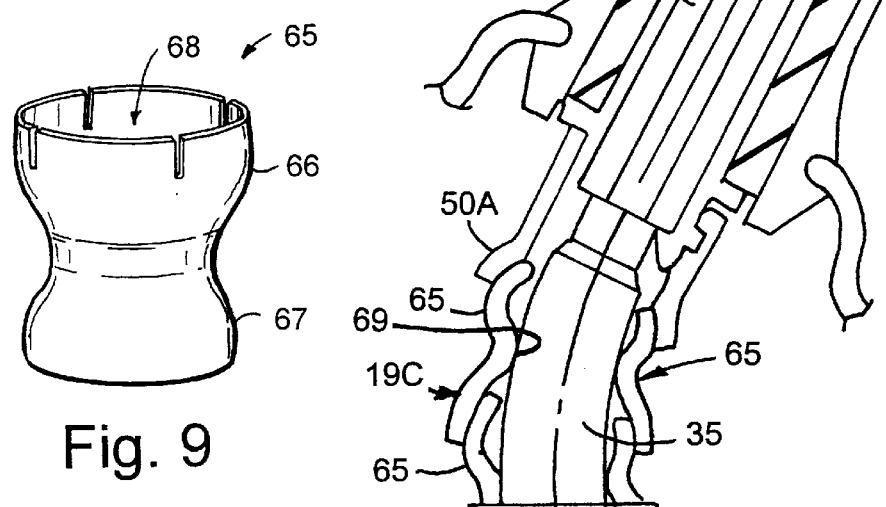
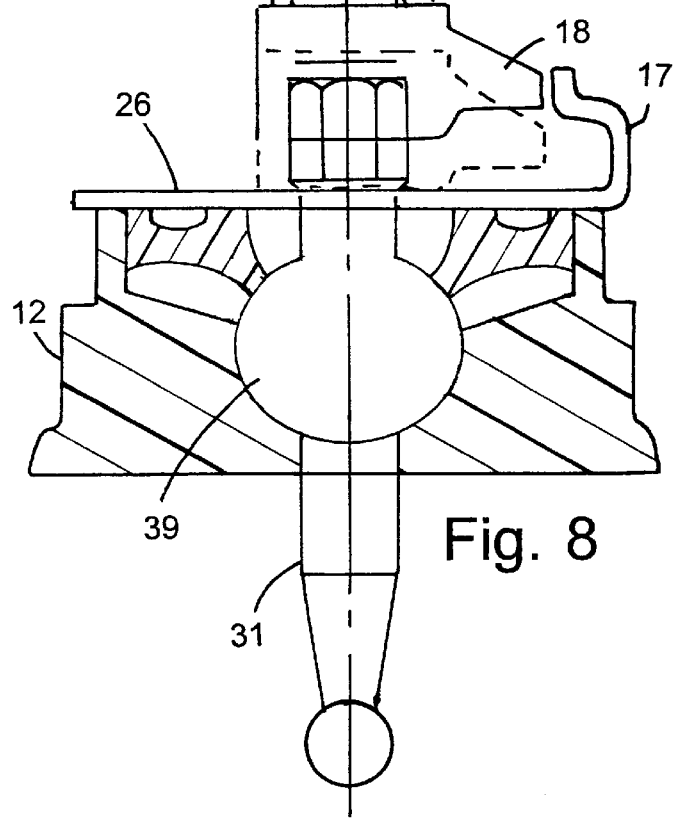

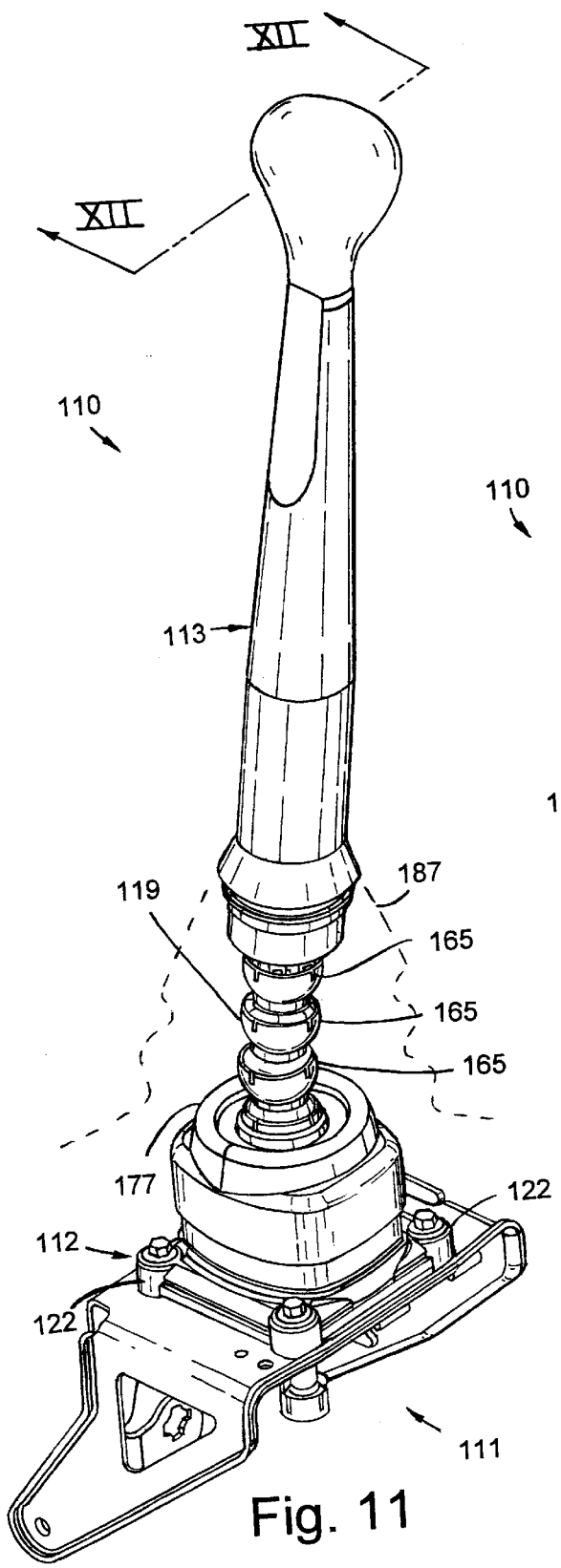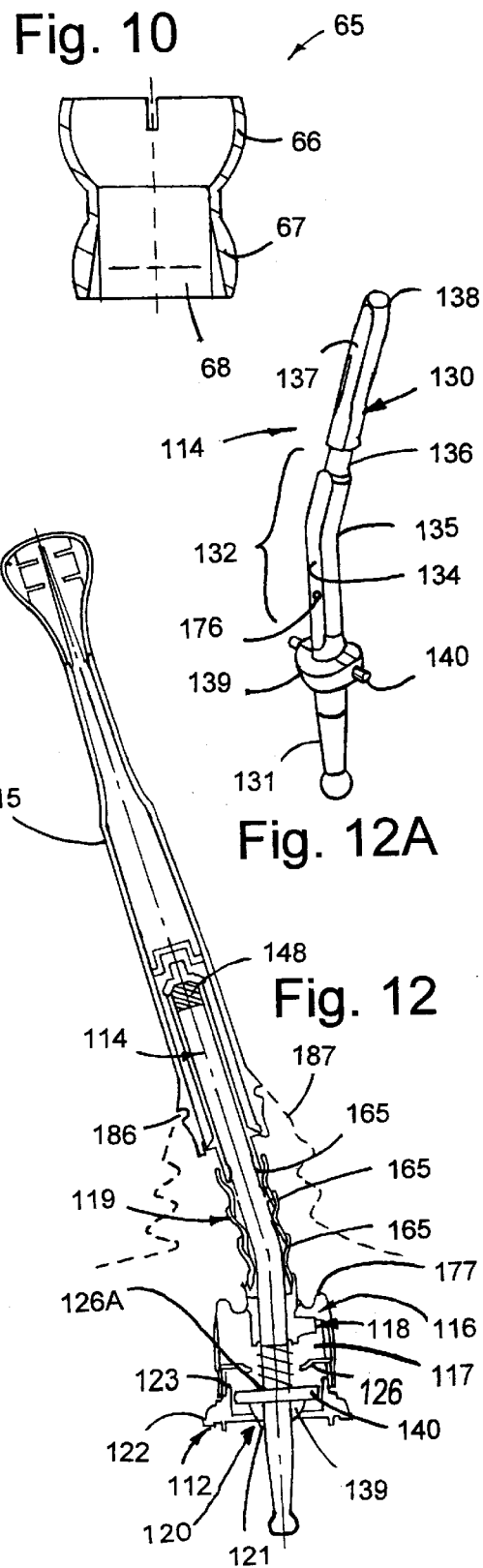

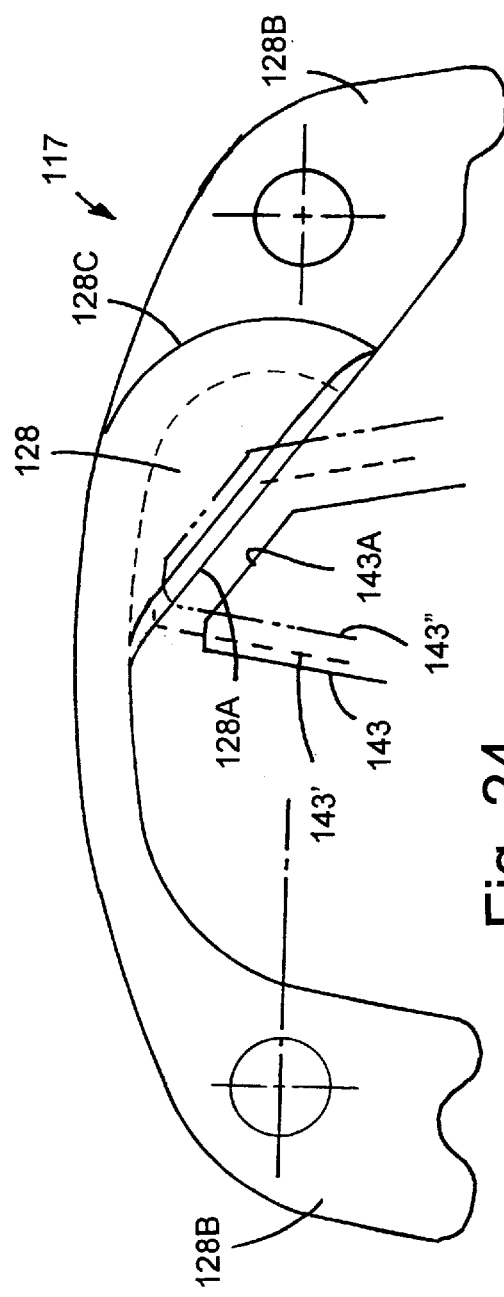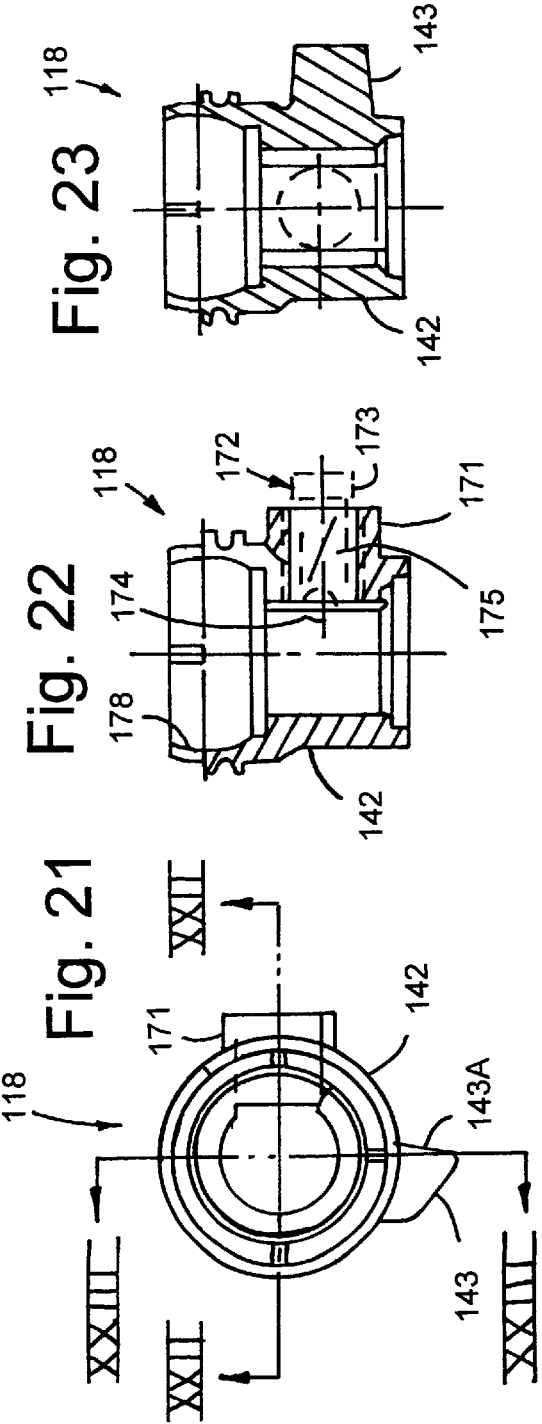

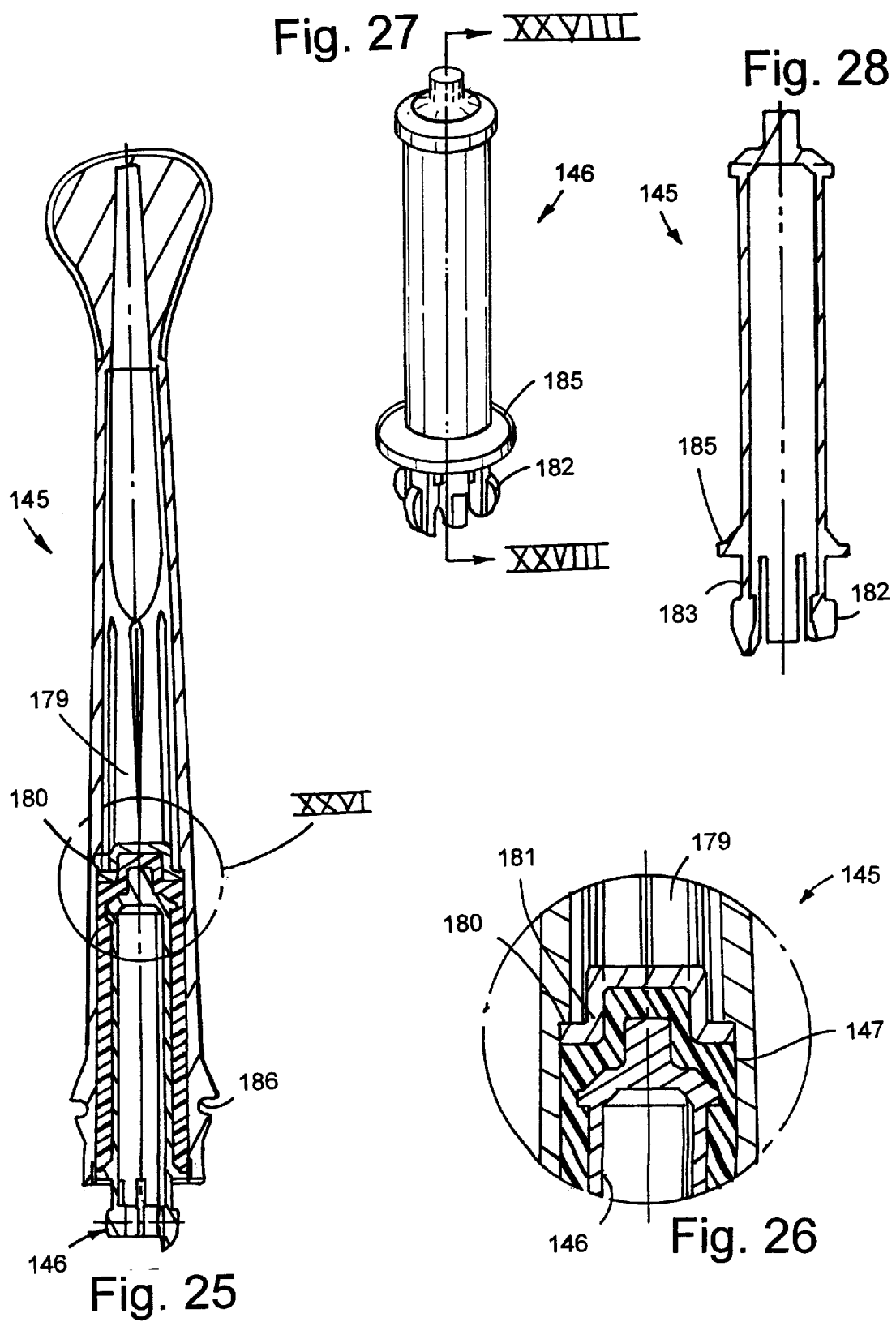

MANUAL TRANSMISSION SHIFTER WITH REVERSE LOCKOUT DEVICE

This application claim benefit to U.S. provisional 60/057,175 filed Aug. 26, 1997.

BACKGROUND OF THE INVENTION

The present invention concerns vehicle shifters for shifting manual transmissions, and more particularly concerns a shifter having a shift lever and a lockout device for controlling movement of the shift lever into a reverse gear position.

Vehicle manufacturers have lockout mechanisms designed to prevent an operator from accidentally and unknowingly shifting a manual transmission into reverse while operating a vehicle. However, such mechanisms have typically included a linkage that is not fully integrated into the shift lever and that is not configured to function in a confined space limited to an area very close to the shift lever. Further, the components of such linkages often are usually designed for use only on a particular model of vehicle, and cannot be used on other vehicle models having different shift lever shapes without substantial modification or several new components.

Therefore, a linkage is desired solving the aforementioned problems and that is compact, simple, easy to assemble, and adaptable for different models and styles of vehicles without the need for a substantial number of new parts and components for each different model or style.

SUMMARY OF THE INVENTION

In one aspect, the present invention includes a shifter for shifting a vehicle transmission including a base adapted for attachment to a vehicle, the base including a pivot-defining mount, and a shift lever adapted for shifting a manual transmission, the shift lever having a bottom section pivoted to the mount, and further having a top section telescopingly engaging the bottom section for movement between a normal height operating position for shifting between gear positions and a depressed position for shifting into a reverse gear position. A reverse lockout device includes a stationary locking member attached to the base and a movable lockout member slidably mounted on the bottom section of the shift lever. A linkage connects the top section of the shift lever to the movable lockout member, the linkage being elongated and extending closely adjacent the bottom section for compact operation next to the bottom section when the top section is depressed.

In another aspect of the present invention, a shifter for shifting a vehicle transmission includes a base adapted for attachment to a vehicle, the base including a pivot-defining mount, and a shift lever having a bottom section pivoted to the mount, and further having a top section slidably engaging the bottom section for movement between a normal height operating position for shifting between gear positions and a depressed position for shifting into a reverse gear position. A reverse lockout device includes a stationary locking member on the base and a movable lockout member slidably mounted on the shift lever. A linkage including a series of interconnected segments connects the top section of the shift lever to the movable lockout member. In a narrower form, the segments have a longitudinally extending bore that receives and slidably engages the bottom section of the lever, so that the segments follow and slide along an elongated portion of the bottom section when the top section is depressed.

In yet another aspect of the present invention, a shifter for shifting a vehicle transmission includes a base adapted for attachment to a vehicle, and a shift lever pivoted to the base for movement between a plurality of gear positions including a reverse gear position. The shift lever includes an elongated post and a handle. A reverse lockout device includes a movable lockout member slidably engaging the elongated post for movement between a first position preventing the shift lever from moving to the reverse gear position, and a second position permitting the shift lever to move to the reverse gear position. The reverse lockout device further includes a detent engaging an irregular surface on the elongated post to provide a predetermined force resisting initial movement of the movable lockout member from the first position, and a linkage connecting the handle to the movable lockout member.

These and other features and advantages of the present invention will be further understood and appreciated by those skilled in the art by reference to the following specification, claims, and appended drawings.

BRIEF DESCRIPTION OF THE DRAWINGS

FIG. 1 is a side cross-sectional view of a shifter embodying the present invention, including a one-piece movable lockout member;

FIGS. 2 and 2A are side and rear views of the movable lockout member shown in FIG. 1;

FIGS. 4 and 5 are side and rear views of a slide portion of the modified lockout member shown in FIG. 3;

FIG. 6 is a perspective view of a pivot-forming portion of the modified lockout member;

FIG. 7 is a rear view of a the shifter shown in FIG. 3, but with a shift lever post that is bent and wherein the modified lockout member is rotated to accommodate the bent shift lever post;

FIG. 8 is a side view of another shifter embodying the present invention, including a multi-segmented chain-type linkage for connecting the movable lockout member to the movable top section of the shift lever;

FIG. 9 is a perspective view of one of the segments of the chain-type linkage;

FIG. 10 is a cross-sectional view of the segment shown in FIG. 9;

FIG. 11 is a side perspective view of yet another modified shifter embodying the present invention, including a one-piece movable lockout member;

FIG. 12 is a cross-sectional view taken along the line XII—XII in FIG. 11;

FIG. 12A is a perspective view of the shift lever rod shown in FIG. 12;

FIG. 21 is a top view of the lockout member shown in FIG. 16;

FIGS. 22 and 23 are cross-sectional views taken along the lines XXII—XXII and XXIII—XXIII in FIG. 21;

FIG. 24 is a top view of the lockout stop similar to FIG. 18, but showing the lockout nose in a centered neutral position (solid lines), in a lateral neutral position (dashed lines) (i.e., ready to be moved into reverse), and in a reverse gear position (phantom lines);

FIG. 25 is an enlarged side cross-sectional view of the shift lever handle assembly shown in FIG. 12;

FIG. 26 is an enlarged view of the circled area XXVI in FIG. 25;

FIG. 27 is a perspective view of a bottom section of the handle assembly shown in FIG. 26; and FIG. 28 is a side cross-sectional view taken along line XXVIII—XXVIII in FIG. 27.

DETAILED DESCRIPTION OF THE PREFERRED EMBODIMENTS

Figure 3:
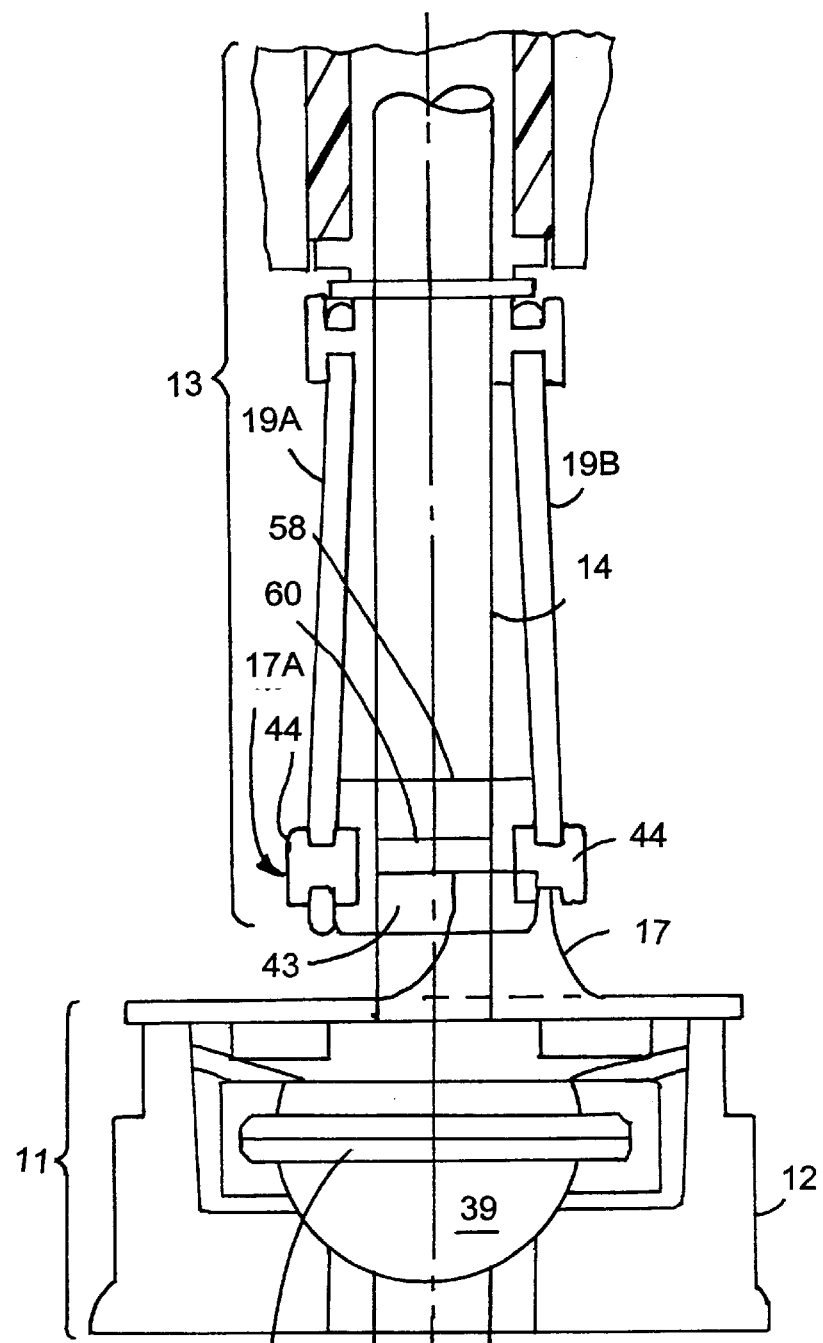
FIG. 3 is a rear view of the shifter shown in FIG. 1, but with a modified two-piece movable lockout member.

A shifter 10 (FIG. 1) embodying the present invention is adapted to shift a manual transmission for a vehicle, such as for shifting from neutral into $1^{st}$, $2^{nd}$, $3^{rd}$, $4^{th}$, $5^{th}$ and reverse R gear positions. The shifter 10 includes a base 11 adapted for attachment to a vehicle including a pivot-defining mount 12, and a shift lever 13 having an elongated bottom section 14 pivoted to the mount 12 and a top section 15 slidably engaging the bottom section 14 for movement between a normal operating position for shifting between gears and a downwardly depressed position for shifting into reverse gear. A reverse lockout device 16 includes a stationary locking member 17 attached to the base 11, and a movable lockout member 18 slidably mounted on the bottom section 14 of the shift lever 13. A linkage 19 connects a bottom of the top section 15 of the shift lever 13 to the movable lockout member 18, the linkage 19 being elongated and extending closely adjacent the elongated bottom section 14 for compact operation next to the elongated bottom section 14 when the top section 15 is depressed. In the form illustrated in FIGS. 1 and 3, the linkage 19 comprises a pair of parallel rigid flat links 19A and 19B located on opposing sides of the elongated bottom section 14 of the shift lever 13, closely adjacent the bottom section 14. In the form illustrated in FIG. 8, the linkage 19C comprises a plurality of links or segments 65 connected in series, some of the links 65 having a ball on one end and others having a socket on another end for engaging the ball, as described below.

Mount 12 (FIG. 1) is a molded part including a body 20 defining a lower part of a spherically-shaped pivot socket 21. Attachment flanges 22 extend from body 20 and are configured for attachment to a vehicle. Upright side flanges 23 extend upwardly from body 20, and define a recess above the pivot socket 21. A bushing 24 fits mateably into the recess above pivot socket 21, and includes a downwardly facing surface 25 shaped to define an upper part of the spherically-shaped pivot socket 21. A stamped sheet metal retainer 26 is attached atop the upright side flanges 23 and is shaped to hold bushing 24 in position above pivot socket 21. One edge of the retainer 26 forms the stationary locking member 17, which comprises an edge tab bent upwardly to define a recess 27 and a stop 28.

The bottom section 14 includes a rod 30 bent to include top and bottom straight sections connected by an arcuate bend. The illustrated rod 30 is bent about an axis that extends from side-to-side of the vehicle, but other bends are contemplated, as discussed below. The rod 30 includes a lower leg 31 with a ball-shaped end 32 for connection to a manual transmission shift linkage. An intermediate section of rod 30 includes a relatively short hex-shaped portion 34, an arcuate portion 35, and a reduced diameter neck portion 36. An upper leg of rod 30 includes an elongated hex-shaped guide portion 37 and a tapered lead-in portion 38. A ball 39 is supported on lower leg 31 at an upper end thereof, and the ball 31 is secured to the lower leg 31 by a transverse guide pin 40. The guide pin 40 rides in vertical slots in the body 20, and prevents the bottom section 14 of shift lever 13 from rotating unacceptably. The ball 39 sets rotatably within pivot socket 21 for two-dimensional pivoting and is secured between body 20 and bushing 24 by retainer 26. One or more flat leaf springs or wave washers 26A are located under retainer 26 and against the ends of pin 40 in a manner known to control the pivoting of ball 39 and to bias shift lever 13 toward a centered position. Holes in the body 20, the bushing 24, and the retainer 26 receive the bottom section 14 and are large enough to permit the shift lever 13 to be rotated between the $1^{st}$ through $5^{th}$ and reverse gears.

Figure 2A:
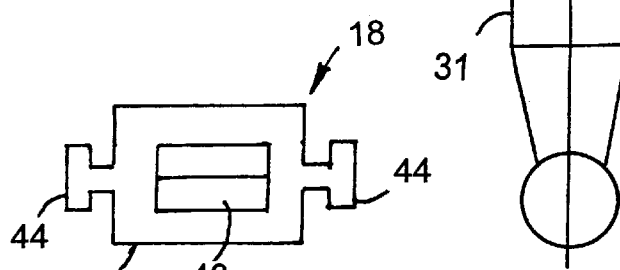
Figure 13:
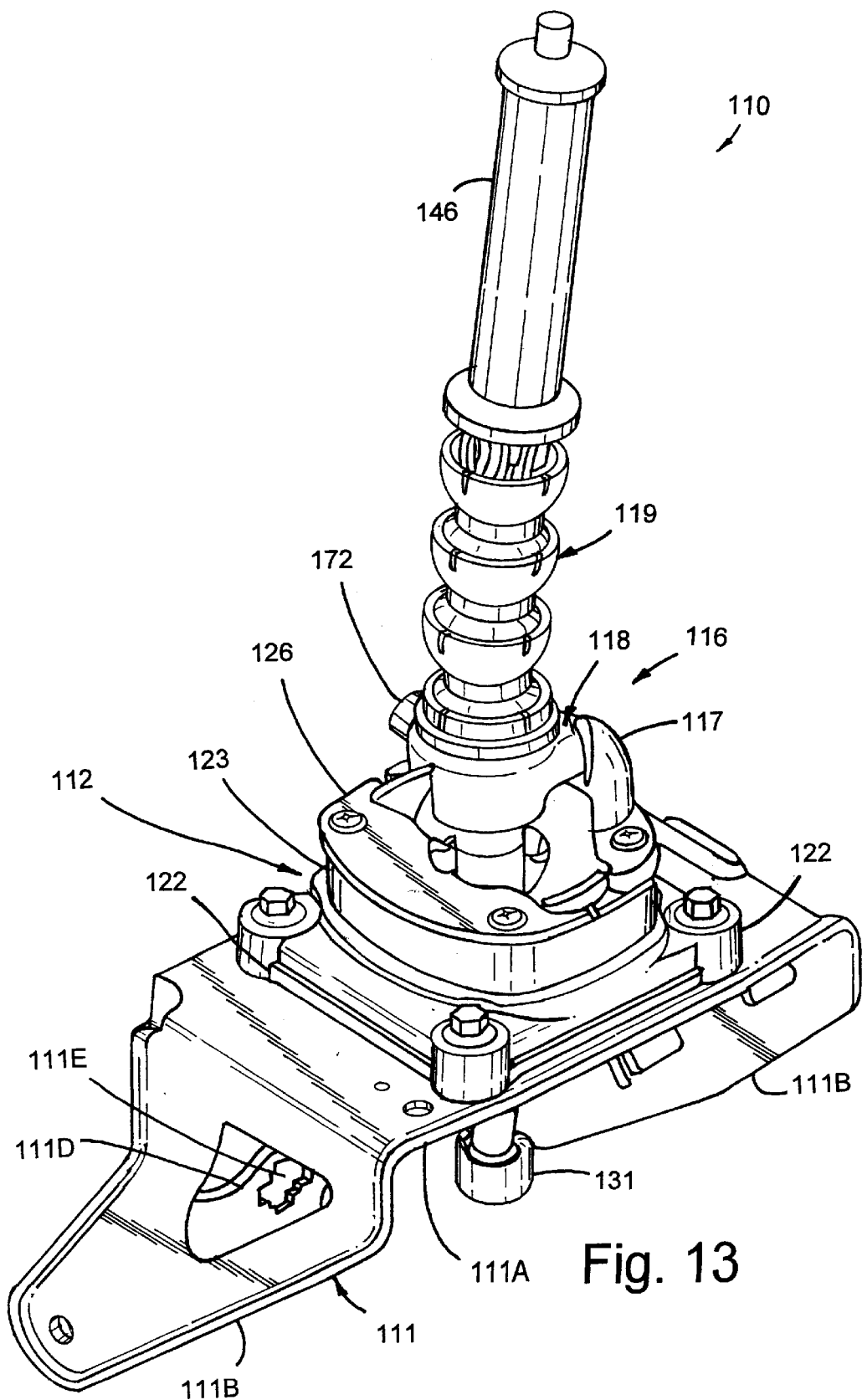
FIGS. 13 and 14 are left, rear, and left front views of the shifter shown in FIG. 11, the shifter boot covering the lockout member being removed to better show the lockout member and the lockout stop arrangement.

Movable lockout member 18 (FIGS. 2 and 2A) includes a ring-shaped body 42 and a laterally extending nose 43. A pair of opposing pivot-defining ears 44 extends from body 42 and defines a pivot axis transverse to the nose 43. Body 42 includes a hex-shaped internal hole that extends vertically therethrough for receiving and slidably engaging the short hex portion 34. The nose 43 is positioned to engage stop 28 when in a raised position and to fit under stop 28 into recess 27 when in a lowered position (for allowing the shift lever 13 to enter reverse).

The top section 15 (FIG. 1) of shift lever 13 includes a hollow post 45, and a hex-shaped socket member 46 secured therein by molded-in dampener material 47. The optimal dampener material 47 comprises thermoplastic elastomer (TPE) supplied by Shell Corporation under the trade name Krayton, although it is contemplated that Santoprene TPE supplied by Advanced Elastomer Systems (Akron, Ohio) can also be used, and that other TPE or other resilient materials can also be used. Krayton is a preferred material since it can be molded into the space between the post 45 and the socket member 46 to form an integrally bonded dampener. Testing has shown that Krayton TPE will satisfactorily bond to, for example, glass-filled polypropylene. It is contemplated that the socket member 46 and/or the post 45 can be made of long glass fiber-filled polypropylene with TPE molded therein to form the dampener. The inner shape of the socket member 46 slidably telescopingly receives the elongated hex-shaped portion 37 to form a stable and extendable joint. A coil spring 48 is positioned inside an end of socket member 46 and engages the tapered portion 38 to bias the top section 15 to an extended position on bottom section 14. The lower end of socket member 46 includes a washer-like flange 49 that snaps into the reduced diameter neck portion 36 to hold the top section 14 on the lower section 15. A cylindrical flange 50 extends below washer-like flange 49 and includes opposing ears 51. Flat straight links 19A and 19B pivotally engage ears 44 and 51 to connect the top section 15 to the bottom section 14 of shift lever 13. Advantageously, the links 19A and 19B are located closely adjacent the arcuate bent rod portion 35, such that the linkage is adapted to function in a confined space with limited useable room.

To operate the device, the vehicle driver depresses the top section 14 of shift lever 13 causing the socket member 46 to telescopingly slide downwardly on hex-shaped guide portion 37 compressing spring 48. The links 19A and 19B concurrently drive the movable lockout member 18 downwardly to a lowered position wherein it fits under stop 28 into recess 27 permitting the shift lever 13 to be moved into the reverse gear position.

A flexible boot 52 (FIG. 1) includes a top lip 53 shaped to engage a mating recess near a bottom end of post 45. Boot 52 further includes a bottom lip 54 shaped for secure attachment to a mating connector 55 on an upper wall 56 of a console.

Not all shift lever rods are bent straight rearwardly about a transverse horizontal axis. Instead, many shift levers are bent rearwardly and transversely in "two planes" such that, in plan view, they are misaligned with a fore-to-aft direction. When this occurs, the movable lockout member 17 will bind as the shift lever is depressed to shift into a reverse gear position unless the movable lockout member 17 is designed for rotation on the shift lever 22. A modified movable lockout member 17A is shown in FIG. 3 that overcomes this problem. The modified movable lockout member 17A is two pieces and includes a non-rotatable ring-shaped body part 58 (FIGS. 4 and 5) having a nose 43 and a hex-shaped hole therein shaped to receive and slidably engage the short hex portion 34 of lower leg 31 of rod 30. A recess 59 is formed in an outer side surface of the body part 58. A rotatable ring clip 60 (FIG. 6) is shaped to snap into the recess 59. The top edge of the body part 58 may include a taper 61 and may be slotted with slots 62 to form fingers to facilitate the assembly of ring clip 60 into recess 59. Ring clip 60 includes ears 44 configured to engage an end of the links 19A and 19B. Ring clip 60 is rotatable on body part 58, such that it can be rotated as shown by arrow "A" during assembly to a desired orientation relative to the bend in the rod 30. This allows the same parts (except for the rod 30) to be used on different shifters. An exemplary two-plane bent rod 30A is shown in FIG. 7. The term "two-plane" is used herein to mean that the rod 30A is bent in a direction that is neither fore-to-aft nor side-to-side. In other words, the rod 30A is bent in a direction that extends diagonally, which direction does not line up with the shift lever movement when the shift lever is moved along neutral from side-to-side, nor when the shift lever is moved from neutral into a gear (i.e., fore-to-aft). Two-plane bent rod 30A is bent diagonally rearwardly about a horizontal axis that is angled at about 30 degrees from a side-to-side direction (i.e., about 60 degrees from a fore-to-aft direction of the vehicle).

The shifter 10A (FIG. 8) includes many components that are similar or identical to the components of shifter 10. These similar or identical components and features are identified by identical numbers to reduce redundant discussion herein. In shifter 10A, the linkage 19 of shifter 10 is replaced with a series of interconnected segments 65. As many or as few segments 65 can be used as are desired. The segments 65 each have a peanut-shaped appearance and include a male end 66 having an outer spherically-shaped surface and a female end 67 having an inner spherically-shaped surface for receiving the male end 66. A bore 68 is formed through the length of the segment 65, the diameter being the size of the rod arcuate portion 35. The center inner surface 69 of the segments 65 have enough surface area to stably engage the arcuate portion 35 of rod 30. The bottom-most segment 65 engages the movable lockout member 18 and the top-most segment 65 engages the bottom of a modified cylindrical flange 50A. This chain-like arrangement telescopingly snakes along the arcuate portion 35 of rod 30 to operably move the movable lockout member 18 as the shift lever top section 15 is depressed.

MODIFICATION

A shifter 110 (FIGS. 11 and 12) includes many components and features that are similar or identical to the components and features on the shifters 10 and 10A. These similar or identical components and features are identified by the same numbers as were used on shifters 10 and 10A, but with the addition of "100" to the numbers. This is done only for the purpose of reducing redundant discussion.

Figure 14:
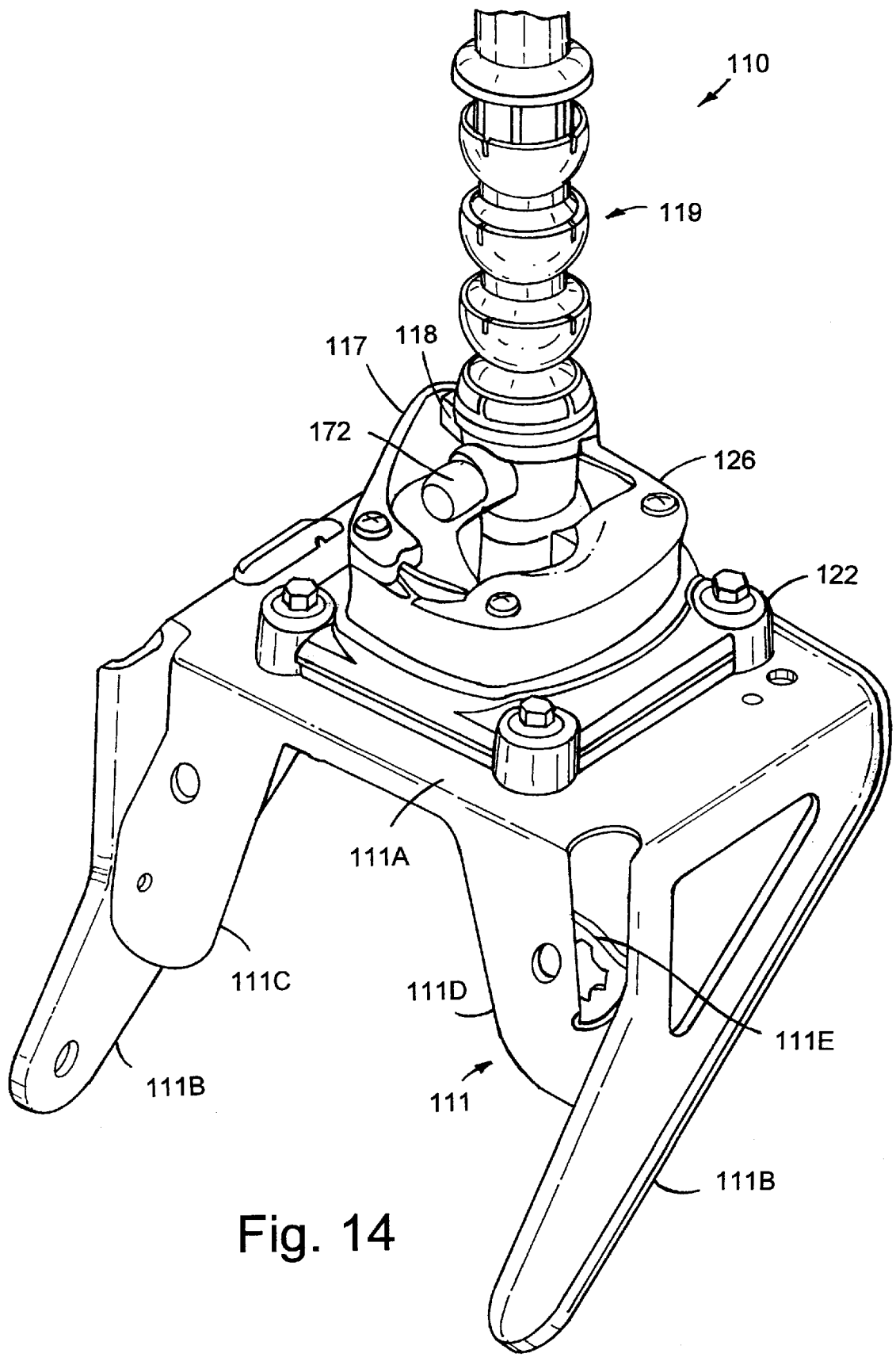
Figure 15:
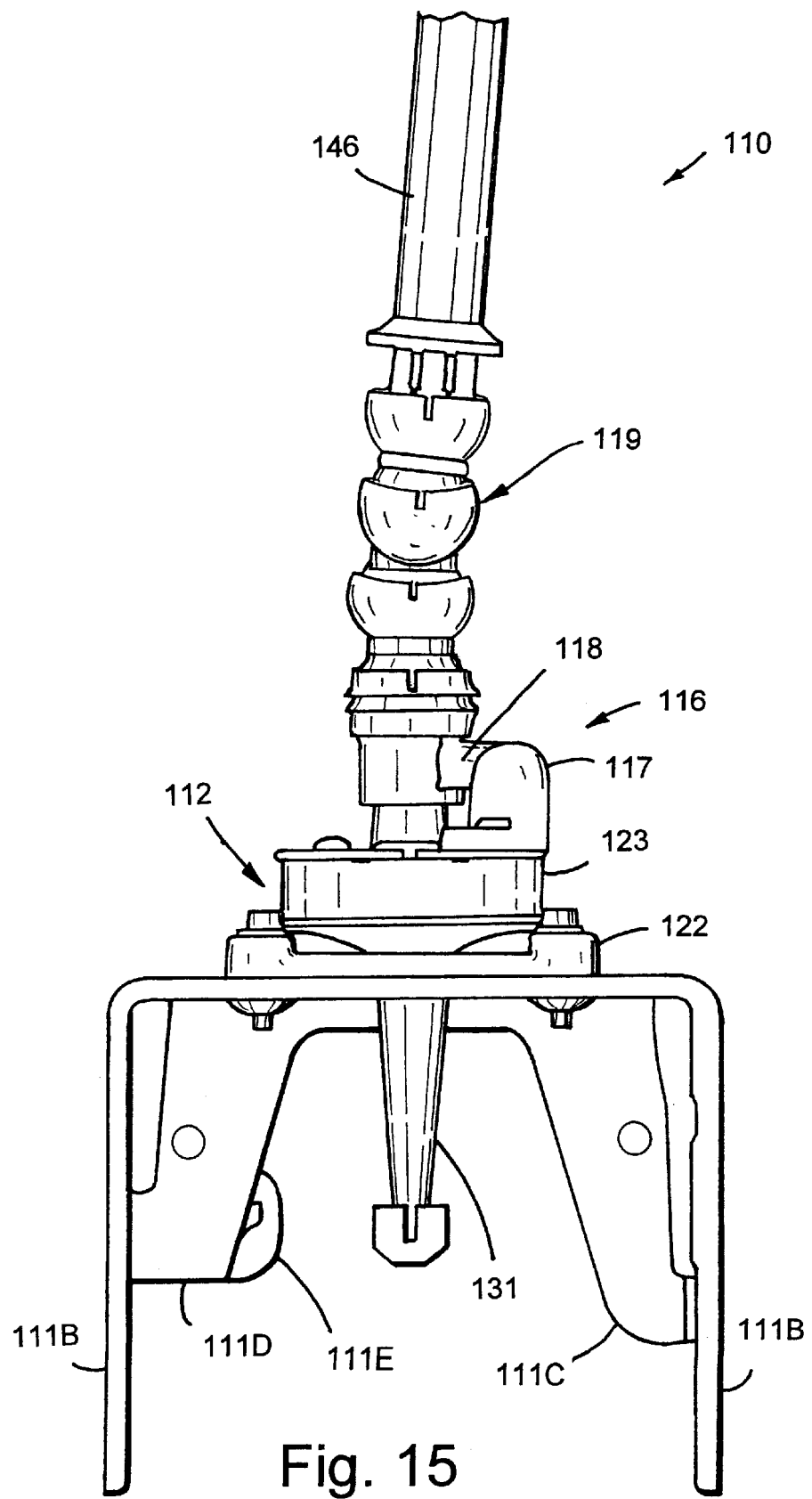
FIGS. 15 and 16 are rear and top views of the shifter shown in FIG. 11.

Shifter 110 (FIG. 11) includes a base 111 and a pivot-defining mount 112 attached to the base 111. Base 111 (FIGS. 14 and 15) comprises a stamping including a relatively flat top wall 111A, perpendicular down flanges 111B, and reinforcing down flanges 111C and 111D. Flange 111D includes an aperture 111E configured to receive and engage an end connecting sheath on a telescopeable Bowden cable. A shift lever 113 has an elongated bottom section 114 pivoted to the mount 112 on a ball-and-socket arrangement, and a top section 115 slidably engaging the bottom section 114 for movement between a normally raised operating position for shifting between $1^{st}$, $2^{nd}$, $3^{rd}$, $4^{th}$, and $5^{th}$ gears. The top section 115 can be moved to a downwardly depressed position for shifting into reverse gear R. A reverse lockout device 116 is attached to the shifter 110 to prevent accidentally shifting into reverse. The reverse lockout device 116 includes a stationary locking member 117 attached to the mount 112, and a movable lockout member 118 slidably mounted on the bottom section 114 of the shift lever 113. A sleeve-type, snake-like linkage 119 connects the top section 115 of the shift lever 113 to the movable lockout member 118. The linkage 119 comprises a series of link segments 165 connected in series, each having a ball on one end and a socket on another end for rotationally engaging the ball of an adjacent link segment.

The mount 112 (FIG. 12) includes a body 120 defining a spherically-shaped pivot socket 121, attachment flanges 122, and upright side flanges 123. The upright side flanges 123 include vertical slots for engaging the ends of a transverse pin 140 described below, and are shaped to mateably receive plate springs 126A held downwardly against the ends of the transverse pin 140 by a retainer 126.

The bottom section 114 of shift lever 113 (FIGS. 12 and 12A) includes a bent rod 130 having straight top and bottom sections connected by a bent section. Rod 130 includes a lower leg 131 adapted for connection to a manual transmission shift linkage or cable. An intermediate section 132 of rod 130 includes a bend 135, a reduced diameter neck portion 136, and a flat side surface 134 that extends along bend 135 up to neck portion 136. Rod 130 also includes an upper leg having a flat side surface 137 and a tapered end portion 138. A ball section 139 is supported on lower leg 131 just below intermediate section 132, and a transverse pin 140 extends through the ball section 139. The plate springs 126A engage the transverse pin 140 and bias the shift lever downwardly, such that the ball section 139 is biased against the pivot socket 121. Further, the plate springs 126A engage opposing ends of the transverse pin 140 in a manner biasing the shift lever toward a centered position along the neutral portion of the shift path. It is noted that plate spring arrangements and other arrangements are known in the art for biasing shift levers to centered positions. For example, see Lampani U.S. Pat. No. 5,507,199 and Niskanen U.S. Pat. No. 5,493,931.

Figure 16:
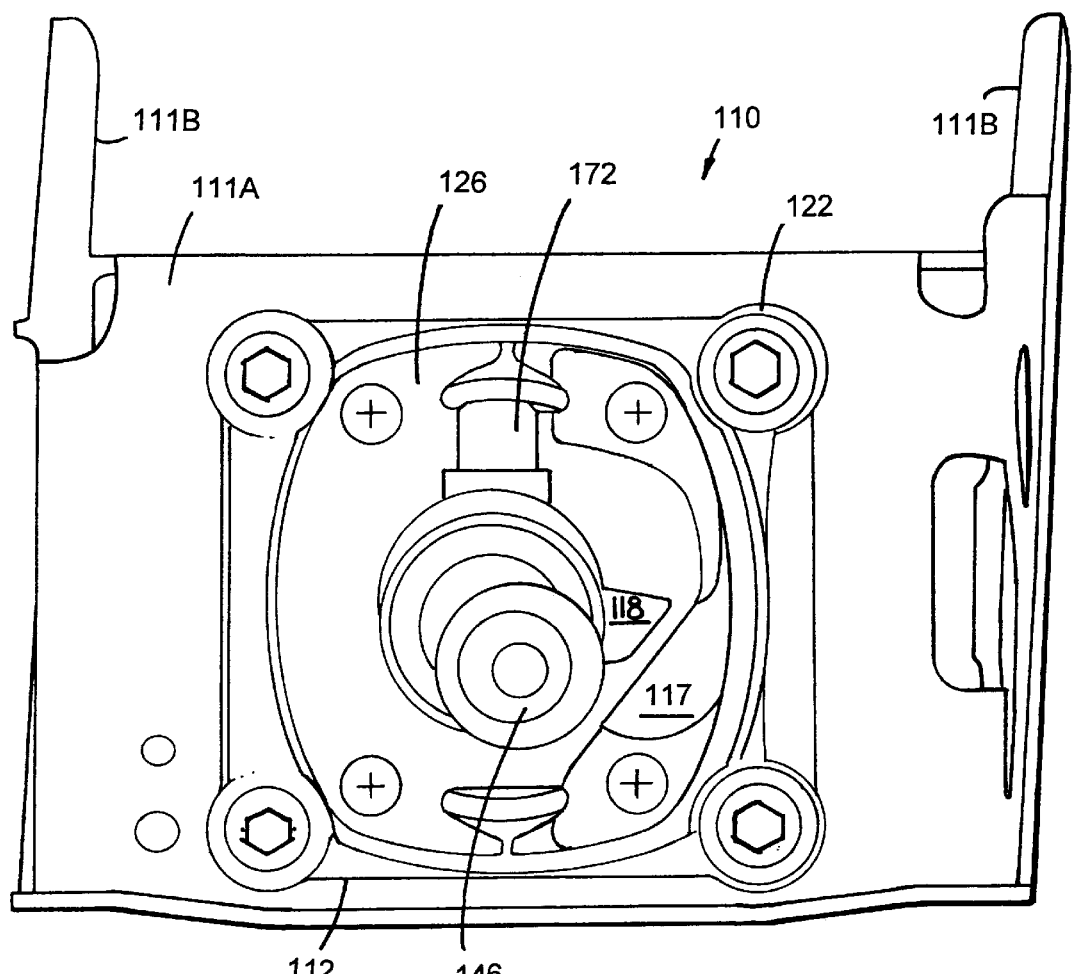
Figure 20:
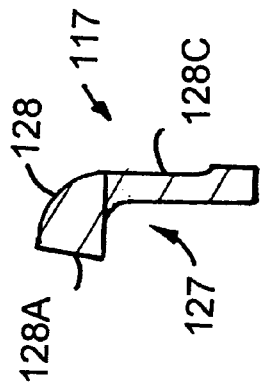
FIG. 20 is a cross-sectional view taken along lines XX—XX in FIG. 18.
Figure 19:
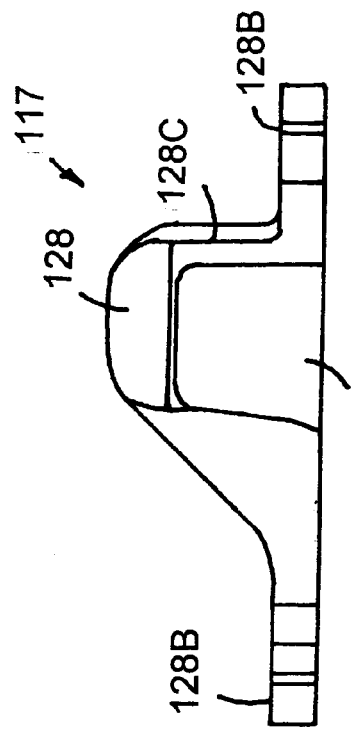
FIGS. 18 and 19 are top and side views of the lockout stop shown in FIG. 17.
Figure 17:
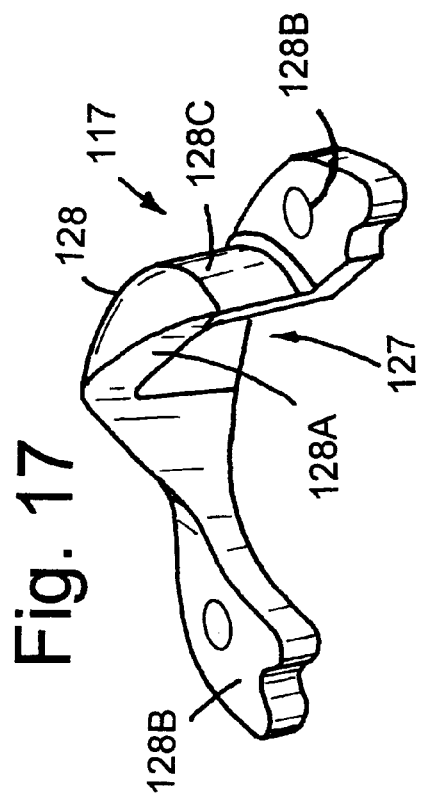
FIG. 17 is a perspective view of the lockout stop shown in FIG. 16.
Figure 18:
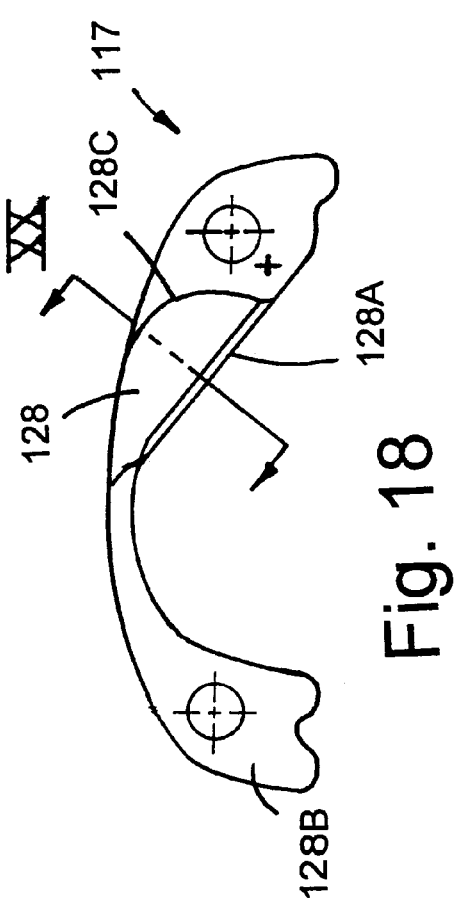

The movable lockout member 118 (FIGS. 21–23) includes a ring-shaped body 142 and a laterally extending nose 143. The body 118 includes an internal hole with a cross section having a cylindrical portion and a flat side portion for slidably but non-rotatably engaging the lower portion of intermediate section 132 of rod 130. The nose 143 is shaped to engage stop 128 when in a raised position, and is further shaped to slip under stop 128 into the recess or cavity 127 when in a lowered position for allowing the shift lever 113 to enter reverse. The nose 143 has an angled face or abutment surface 143A (when viewed from the top, see FIG. 16) and the stop 128 has a correspondingly angled abutment surface 128A, which surfaces 143A and 128A include sufficient surface area for long term wear. The surfaces 143A and 128A are angled with respect to the direction of movement of the stop 128 as they engage. By enlarging these surfaces, their larger surface area prevents excessive wear to the stop 128 so that, over time, the surfaces do not wear to a condition that allows the shift lever 113 to be shifted into reverse even when the shift lever 113 is not depressed. In FIG. 24, the lockout nose 143 in solid lines shows the shift lever 113 in a centered neutral position, and nose 143' in dashed lines shows the shift lever 143 in a lateral neutral position (i.e., ready to be moved into reverse), and nose 143' in phantom lines shows the shift lever 113 in a reverse gear position. The stop 128 (FIGS. 17–20) includes a pair of flanges 128B adapted to receive screws for attaching the stop 128 to a top of the mount 112, and further includes an arching, concave flange 128C defining the recess 127 for receiving the nose 143. The flange 128C includes the angled abutment surface 128A, which is located generally over the recess 127.

The movable lockout member 118 (FIG. 22) includes a boss 171. A detent 172 includes a hollow shaft 173 threaded into the boss 171, and a ball 174 operably positioned in the shaft and biased outwardly by an internal spring 175. A depression 176 (FIG. 12A) is located on the flat surface 134 in a location that corresponds to the ball 174 when the movable lockout member 118 is in the raised position. The ball 174 releasably engages the depression 176 in a manner that requires an initial downward force of about 30N on the top section 115 of the shift lever 113 to slide the movable lockout member 118 downwardly out of the depressed position. A boot 177 (FIG. 12) is attached to the mount 112 for covering the area around movable lockout member 118 up to the bottom of the linkage 119. The top section of movable lockout member 118 includes a spherically-shaped inner surface 178 shaped to mateably engage the male end 166 of the bottom-most segment 165. The segments 165 are operably interconnected in series and are slidably supported on the intermediate section 132 of rod 130 for vertical telescoping movement.

The top section 115 of shift lever 113 includes a hollow molded post 145 (FIGS. 25–28) that defines a downwardly facing cavity 179 having a shoulder 180. A washer 181 is positioned against the shoulder 180, and a socket member 146 is secured in the cavity 179 by a molded-in dampener material 147, such as TPE. The inner shape of the socket member 146 defines a cavity for telescopingly engaging a top of the rod 130 to form a stable and extendable joint. A coil spring 148 (FIG. 12A) is positioned inside an end of socket member 146 and engages an end portion 138 of rod 130 to bias the top section 115 to an extended position on bottom section 114. The lower end of the socket member 146 (FIG. 28) includes longitudinally extending flexible fingers 182 having an outer ball-shaped contour adapted to rotatably securely engage the top spherically-shaped female end 167 of the top segment 165. An inner ridge 183 on the fingers 182 engages the recess 136 on the rod 130 (FIG. 12A) to prevent the handle post 145 from simply telescoping vertically off of the rod 130. The inner ridge 183 also limits the overall travel of the handle post 183 on the rod 130. An annular flange 185 closes an end of the cavity 179 to help contain the TPE dampening material 147 as it is molded into the cavity 179. Secondary annular flanges 186 (FIG. 25) on the exterior and bottom of the molded post 145 define a recess for engaging a top of the outer boot 187 (FIG. 12).

In the foregoing description, it will be readily appreciated by those skilled in the art that modifications may be made to the invention without departing from the concepts disclosed herein. Such modifications are to be considered as covered by the following claims, unless the claims by their language expressly state otherwise.

What is claimed is:

1. A shifter for shifting a vehicle transmission comprising:
   a base adapted for attachment to a vehicle, the base including a pivot-defining mount;
   a shift lever adapted for shifting a manual transmission, the shift lever including a bottom section pivoted to the mount, and a top section telescopingly engaging the bottom section for movement between a normal height operating position for shifting between gear positions and a depressed position for shifting into a reverse gear position; the shift lever including a dampener material isolating the top section from the bottom section to reduce vibration on the top section;
   a reverse lockout device including a stationary locking member on the base and a movable lockout member slidably mounted on the bottom section of the shift lever; and
   a linkage connecting the top section of the shift lever to the movable lockout member, the linkage being elongated and extending closely adjacent the bottom section for compact operation when the top section of the shift lever is depressed.

2. The shifter defined in claim 1 wherein the linkage includes opposing elongated links each pivoted to the top section and to the movable lockout member.

3. The shifter defined in claim 2 wherein the movable locking member includes a slider body slidably engaging the bottom section, and a ring rotatably engaging the slider body and pivotally engaging the linkage.

4. The shifter defined in claim 1 wherein the stationary and movable locking members include abutting surfaces that engage when the top section of the shift lever is in the normal height operating position and a vehicle driver attempts to shift the shift lever into the reverse gear position, but that are misaligned when the top section of the shift lever is in the depressed position.

5. The shifter defined in claim 4 wherein the abutting surfaces define a plane that extends at an angle to a direction defined by movements of the shift lever into the reverse gear position.

6. The shift lever defined in claim 1 including a detent on one of the shift lever, the reverse lockout device, and the linkage, the detent providing a predetermined force resisting initial depression of the top section.

7. A shifter for shifting a vehicle transmission comprising:
   a base adapted for attachment to a vehicle, the base including a pivot-defining mount;
   a shift lever adapted for shifting a manual transmission, the shift lever including a bottom section pivoted to the mount, and a top section telescopingly engaging the bottom section for movement between a normal height operating position for shifting between gear positions and a depressed position for shifting into a reverse gear position;
   a reverse lockout device including a stationary locking member on the base and a movable lockout member slidably mounted on the bottom section of the shift lever; and
   a linkage connecting the top section of the shift lever to the movable lockout member, the linkage being elongated and extending closely adjacent the bottom section for compact operation when the top section of the shift lever is depressed; and wherein the bottom section includes an elongated bent rod part and the linkage includes a plurality of segments connected together to form a snake-like chain that extends along and outer surface of the elongated bent rod part of the bottom section.

8. The shifter defined in claim 7 wherein at least one of the segments has a ball section at one end and a socket at another end for receiving a ball-shaped end of an adjacent segment.

9. The shifter defined in claim 7 wherein the segments each include a longitudinally extending central bore that slidably engages the elongated part of the bottom section.

10. A shifter for shifting a vehicle transmission comprising:
   a base adapted for attachment to a vehicle, the base including a pivot-defining mount;
   a shift lever adapted for shifting a manual transmission, the shift lever including a bottom section pivoted to the mount, and a top section telescopingly engaging the bottom section for movement between a normal height operating position for shifting between gear positions and a depressed position for shifting into a reverse gear position;
   a reverse lockout device including a stationary locking member on the base and a movable lockout member slidably mounted on the bottom section of the shift lever; and
   a linkage connecting the top section of the shift lever to the movable lockout member, the linkage being elongated and extending closely adjacent the bottom section for compact operation when the top section of the shift lever is depressed; and a detent providing a predetermined force resisting initial depression of the top section, the detent comprising a spring biased member on the movable lockout member and a recess on the bottom section operably engaged by the spring biased member.

11. A shifter for shifting a vehicle transmission comprising:
   a base adapted for attachment to a vehicle, the base including a pivot-defining mount;
   a shift lever including a bottom section pivoted to the mount, and a top section slidably engaging the bottom section for movement between a normal height operating position for shifting between gear positions and a depressed position for shifting into a reverse gear position;
   a reverse lockout device including a stationary locking member on the base and a movable lockout member slidably mounted on the shift lever; and
   a linkage connecting the top section of the shift lever to the movable lockout member, the linkage including a series of segments interconnected, each having a bore receiving and slidably engaging the bottom section so that the segments follow and slide along the bottom section when the top section is depressed.

12. The shifter defined in claim 11 wherein at least one of the segments includes a ball section at one end and a socket at another end for receiving a ball-shaped end of an adjacent segment.

13. The shifter defined in claim 11 wherein the shift lever includes a dampener material isolating the top section from the bottom section to reduce vibration on the top section.

14. A shifter for shifting a vehicle transmission comprising:
   a base adapted for attachment to a vehicle;
   a bent shift lever pivoted to the base for movement between a plurality of gear positions including a reverse gear position, the shift lever including a handle telescopingly engaging an elongated post;
   a reverse lockout device including a movable lockout member slidably engaging the elongated post for movement between a first position preventing the shift lever from moving to the reverse gear position and a second position permitting the shift lever to move to the reverse gear position, the movable lockout member including a detent engaging an irregular surface on the elongated post to provide a predetermined force resisting initial movement of the movable lockout member from the first position; and
   a linkage connecting the handle to the movable lockout member, the linkage includes a series of interconnected segments, each having a bore that receives and slidably engages the elongated post.

15. The shifter defined in claim 14 wherein the irregular surface is a recess.

16. The shifter defined in claim 14 wherein the shift lever includes a dampener material that reduces vibration transmitted to the handle.

17. The shifter defined in claim 14 wherein the base includes a stop attached to the base, the movable lockout member and the stop including abutting surfaces that engage when the movable lockout member is in the first position but that misalign when the movable lockout member is in the second position, the abutting surfaces defining a plane that extends at an angle to a direction defined by movement of the shift lever into the reverse gear position.

18. A shifter for shifting a vehicle transmission comprising:
   a base adapted for attachment to a vehicle, the base including a pivot-defining mount;
   a shift lever adapted for shifting a manual transmission, the shift lever including a bottom section pivoted to the mount, and a top section telescopingly engaging the bottom section for movement between a normal height operating position for shifting between gear positions and a depressed position for shifting into a reverse gear position;
   a reverse lockout device including a stationary locking member on the base and a movable lockout member slidably mounted on the bottom section of the shift lever; and
   a linkage connecting the top section of the shift lever to the movable lockout member, the linkage having a series of interconnected segments disposed about an outer surface of the bottom section and extending closely adjacent the bottom section for compact operation when the top section of the shift lever is depressed.

* * * * *